April 17, 1945.  A. ARNOT  2,373,736
CONTROL GEAR FOR ELECTRIC MOTOR DRIVEN MECHANISMS
Filed July 8, 1943
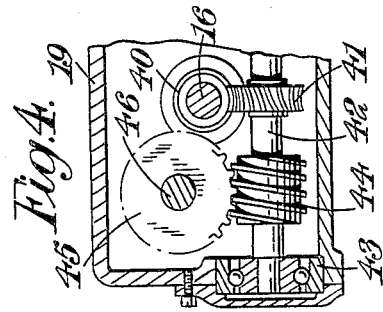
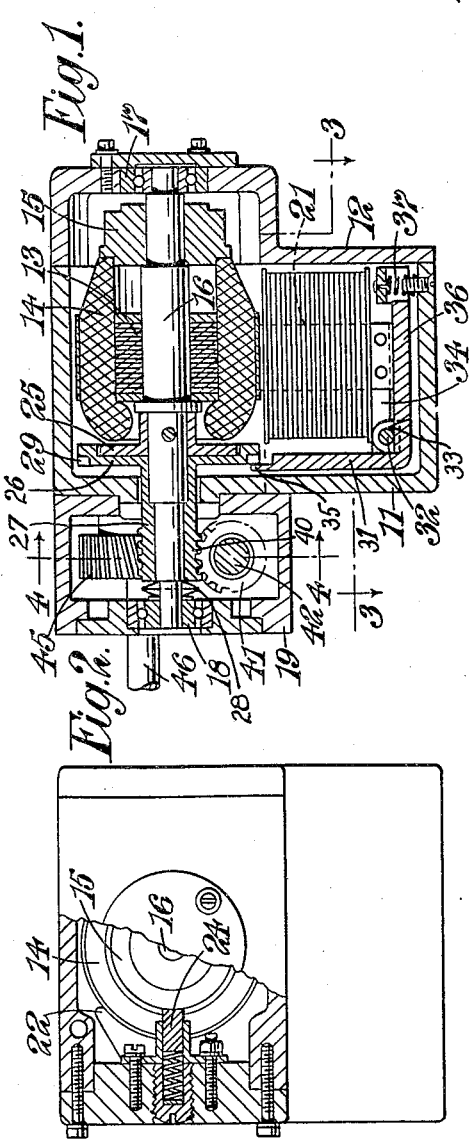
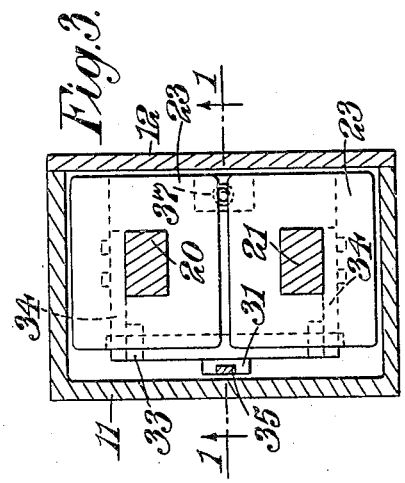
Inventor
Alfred Arnot
By Watson, Cole, Grindle & Watson
ATTYS Patented Apr. 17, 1945

2,373,736

UNITED STATES PATENT OFFICE 2,373,736

CONTROL GEAR FOR ELECTRIC MOTOR DRIVEN MECHANISMS

Alfred Arnot, Warrington, England, assignor to Aeronautical & Mechanical Investments Limited, a British company Application July 8, 1943, Serial No. 493,903
In Great Britain May 11, 1942

3 Claims. (Cl. 172—36)

This invention comprises improvements in or relating to control gear for electric motor driven mechanisms.

It is an object of the invention to provide means to ensure that, in the event of the electric driving motor being shut off, the stoppage of the driving shaft is substantially instantaneous, that is to say overrunning is prevented. The motor drive herein described may be used, for instance, in connection with apparatus as described in United States patent specification Serial No. 469,270.

The present invention comprises in control gear for electric motors the provision of a stopping mechanism for the apparatus driven by the motor, in the form of a brake or stop or a clutch between the motor and the driven apparatus, and an electromagnetically operated actuating-device for said stopping mechanism which device is associated with the magnetic field system of the motor so as to be operated to stop the driven apparatus when the field system of the motor is put out of operation. The actuating-device associated with the magnetic field system supplies the operating force normally required by mechanical or electro-mechanical braking or clutch mechanisms already in existence. Thus switching on the motor would reelase the brake or engage the clutch or coupling, whilst switching off the motor would engage the brake by spring pressure or release the clutch or coupling respectively. In one form a slip coupling is interposed between the motor shaft and the driven mechanism and is capable of transmitting the driving torque but of slipping at a higher torque, and the actuating-device is so arranged as to stop the driven side of the coupling when the motor is switched off, while allowing the motor armature to continue to rotate under the effect of its own inertia for a sufficient number of revolutions to obviate undue straining of the parts.

Preferably the stop device consists of a rotatable abutment or abutments upon the driven side of the friction slip coupling and a movable stop member capable of being moved into the path of the abutment or abutments.

The following is a description by way of example of one form of electric motor comprising a control mechanism for the drive in accordance with the present invention, reference being made to the accompanying drawing, in which:

Figure 1 is a vertical longitudinal section through a motor;

Figure 2 is an end elevation with parts broken away to show the internal construction, looking from the righthand end as viewed in Figure 1;

Figure 3 is a sectional plan upon the line 3—3 of Figure 1;

Figure 4 is a section upon the line 4—4 of Figure 1.

The electric motor shown is of light weight for its power and is intended for operating apparatus, such for example as that described in the aforesaid co-pending patent specification Serial No. 469,270.

The motor is totally enclosed and comprises a casing 11 one end of which is closed in the completed motor by an end plate 12. The motor is a bipolar motor comprising an armature 13 having a winding 14 and commutator 15 supported on a shaft 16 carried in ball bearings 17 (in the end plate 12) and 18 (in a casing 19 secured to the casing 11). The field magnets comprise two magnet cores 20, 21 which carry pole pieces 22 adjacent to the armature 14 and the cores 21 are surrounded by magnet windings 23. Brushes 24 bear on the commutator 15 and one at least of the brushes is inserted from the casing 11, in well known manner.

Upon the shaft 16 there is mounted a driving disc 25 which engages a driven disc 26 of a friction clutch. The driven disc 26 is mounted on a sleeve 27 which runs on the shaft 16 and the disc 26 is urged into engagement with the driving disc 25 by means of two curved spring washers 28 which surround the shaft 16 and are interposed between the ball race 18 and the end of the sleeve 27. Thus the friction clutch constituted by the plates 25, 26 is normally held in close driving engagement, and the strength of the spring washers 28 is made sufficient to cause the friction clutch to transmit the full driving torque of the motor, but to slip at a slightly higher torque.

The driven disc 26 of the friction clutch 25, 26 is notched out around a part of its periphery as shown at 29. A stop member 31 is provided which is mounted on a strong pivot 32 by means of a hub 33. The pivot 32 is supported in brackets 34 secured to the lower ends of the pole pieces of the magnet winding, 20 or 21 as the case may be. The stop member 31 has an abutment 35 at its upper end which is capable of being swung into the path of the abutments provided by the notches 29. Normally, when the motor is running the stop member 31 and its abutment 35 are held out of the path of the abutments provided by the ends of the notches 29 and 30 because, from the lower end of the stop member 31, close to the pivot 32, there extends a horizontal armature 36 which underlies the lower ends of the cores 20, 21 of the field magnets and which, when these magnets are excited and passing current through the windings 23, is attracted by the magnet cores and complete their magnetic circuit.

As soon as the field magnets lose their magnetism due to the circuit of the field windings 23 being broken the armature 36 falls away and the stop 35 comes into the path of the abutments on the driven member 26 of the clutch, or slip coupling as it may be termed. The bias is afforded to the armature 36 by means of a tension spring 37.

The stop 35 falls into the way of the abutments formed by the recesses 30 and the stop has only to absorb the shock due to the inertia of the very light plate 26, sleeve 27 and relatively slow-moving parts driven thereby. The relatively heavy and fast-moving armature 13, 14 can continue spinning, the clutch plate 25 slipping on the plate 26 until the energy of the parts has been absorbed without unduly stressing any part of the mechanism. The slipping clutch itself acts as a brake.

The sleeve 27 is formed so as to provide a worm 40 which drives a worm-wheel 41 on a cross-shaft 42 beneath the shaft 16. The cross-shaft 42 is supported in ball-bearings 43 (see Figure 4) and carries a second worm 44 which drives worm-wheel 45 on a final drive shaft 46. All these parts are enclosed in the casing 19 and it will be seen that a powerful drive is provided for a slow speed shaft which can be stopped practically instantaneously at any point in its movement.

I claim:

1. A driving device comprising, in combination, a supporting frame, an electric motor on said frame, said motor including a field magnet and a rotatable armature having a shaft comprising a driving element, an element to be driven, a slip friction coupling carried on said armature shaft and comprising a driving member fixed to said shaft, a driven member in frictional contact with said driving member and a spring urging said members together with such force that the coupling is capable of transmitting the intended driving torque but of slipping at a higher torque, an abutment on said driven member of the coupling, a stop arm pivoted to said frame and movable into and out of the path of said abutment, a normally stationary armature operatively connected with said stop arm and disposed adjacent said field magnet and within the field of influence thereof, and resilient means for urging said last named armature away from said magnet and the stop arm into the path of said abutment, the excitation of the field magnet causing said armature to move against the influence of the resilient means and the stop arm to move out of the path of said abutment.

2. A driving device comprising, in combination, a supporting frame, an electric motor on said frame, said motor including a field magnet and a rotatable armature having a shaft comprising a driving element, an element to be driven, a slip friction coupling carried on said armature shaft and comprising a driving member fixed to said shaft, a driven member in frictional contact with said driving member and a spring urging said members together with such force that the coupling is capable of transmitting the intended driving torque but of slipping at a higher torque, an abutment on said driven member of the coupling, a stop arm pivoted to said frame and movable into and out of the path of said abutment, a normally stationary armature operatively connected with said stop arm and disposed adjacent said field magnet and within the field of influence thereof, and a coil tension spring directly connected between said last named armature and a stationary portion of the frame for urging said armature away from said magnet and the stop arm into the path of said abutment, the excitation of the field magnet causing said armature to move against the influence of the spring and the stop arm to move out of the path of said abutment.

3. A driving device comprising, in combination, a supporting frame, an electric motor on said frame, said motor including a field magnet and a rotatable armature having a shaft comprising a driving element, an element to be driven, a slip friction coupling carried on said armature shaft and comprising a driving disc fixed to said shaft, a driven disc in frictional contact with said driving disc and a spring urging said discs together with such force that the coupling is capable of transmitting the intended driving torque, an abutment on said driven disc of the coupling, an L-shaped member pivoted at its angle portion to a fixed part of said device for limited rocking movement, a finger on one arm of said L-shaped member and adapted to be moved into and out of the path of said abutment upon rocking of the L-shaped member, the other arm of said member lying at all times within the magnetic field of said field magnet, a coil spring disposed between said last named arm and said frame and adapted to oppose the movement of said arm toward said magnet, the L-shaped member being so constructed and arranged that upon excitation of said field magnet the member is moved to carry said finger out of the path of said abutment and upon de-energization of said magnet the spring causes the member to carry said finger into the path of said abutment to stop the driven member of the coupling and thus the driven element, regardless of any overrunning of the motor armature due to inertia.

ALFRED ARNOT.